(12) United States Patent
Luo et al.

(10) Patent No.: US 12,203,526 B2
(45) Date of Patent: Jan. 21, 2025

(54) NEGATIVE STIFFNESS GENERATING MECHANISM AND QUASI-ZERO STIFFNESS VIBRATION ISOLATOR

(71) Applicant: Chongqing University, Chongqing (CN)

(72) Inventors: Jun Luo, Chongqing (CN); Xu Chen, Chongqing (CN); Huayan Pu, Chongqing (CN); Jinglei Zhao, Chongqing (CN); Yan Jing, Chongqing (CN)

(73) Assignee: Chongqing University, Chongqing (CN)

( * ) Notice: Subject to any disclaimer, the term of this patent is extended or adjusted under 35 U.S.C. 154(b) by 547 days.

(21) Appl. No.: 17/655,294

(22) Filed: Mar. 17, 2022

(65) Prior Publication Data

US 2023/0074188 A1 Mar. 9, 2023

(30) Foreign Application Priority Data

Sep. 8, 2021 (CN) .......................... 202111048472.0

(51) Int. Cl.
*F16F 6/00* (2006.01)
*F16F 15/18* (2006.01)

(52) U.S. Cl.
CPC .............. *F16F 15/18* (2013.01); *F16F 6/005* (2013.01); *F16F 2222/06* (2013.01);
(Continued)

(58) Field of Classification Search
CPC ........ F16F 15/18; F16F 6/005; F16F 2222/06; F16F 2228/063; F16F 2230/0029; F16F 2232/02
(Continued)

(56) References Cited

U.S. PATENT DOCUMENTS 4,314,623 A * 2/1982 Kurokawa ............... G12B 3/00
188/267
4,432,441 A * 2/1984 Kurokawa ............... G02B 7/00
188/267
(Continued)

FOREIGN PATENT DOCUMENTS

CN 104747652 A 7/2015
CN 108167362 A 6/2018
CN 110219921 A 9/2019

OTHER PUBLICATIONS

The First Office Action, Chinese Patent Application No. 202111048472. 0, Apr. 2, 2022, 3 pages.

*Primary Examiner* — Xuan Lan Nguyen
(74) *Attorney, Agent, or Firm* — Stanek Lemon Crouse & Meeks PA (57) ABSTRACT

A negative stiffness generating mechanism and a quasi-zero stiffness vibration isolator are provided. A housing is mounted on a base, and the axial relative positions of the housing and the base can be adjusted; a negative stiffness unit comprises inner-ring magnets, outer-ring magnets and a supporting shaft, the supporting shaft axially slides on the base and passes through the housing, the inner-ring magnets fixedly sleeve the supporting shaft, and the outer-ring magnets sleeve outside the inner-ring magnets and are divided into upper and lower groups of outer-ring magnets; the upper and lower groups of outer-ring magnets can synchronously move through a negative stiffness adjusting device; and the axial relative positions of the middle planes of the outer-ring and inner-ring magnets can be adjusted by adjusting the axial relative positions of the housing and the base. The isolator comprises a negative stiffness generating mechanism and a positive stiffness unit.

17 Claims, 8 Drawing Sheets

(52) U.S. Cl.
CPC . *F16F 2228/063* (2013.01); *F16F 2230/0029* (2013.01); *F16F 2232/02* (2013.01)

(58) Field of Classification Search
USPC .......................................... 188/267
See application file for complete search history.

(56) References Cited

U.S. PATENT DOCUMENTS

| | | | | |
|---|---|---|---|---|
| 5,584,367 | A * | 12/1996 | Berdut | B60L 13/10 |
| | | | | 104/294 |
| 6,588,554 | B2 * | 7/2003 | Fujita | F16F 6/005 |
| | | | | 188/267 |
| 10,753,770 | B2 * | 8/2020 | Pu | G01B 7/023 |

* cited by examiner

NEGATIVE STIFFNESS GENERATING MECHANISM AND QUASI-ZERO STIFFNESS VIBRATION ISOLATOR

CROSS REFERENCE TO RELATED APPLICATION

This patent application claims the benefit and priority of Chinese Patent Application No. 202111048472.0 filed on Sep. 8, 2021, the disclosure of which is incorporated by reference herein in its entirety as part of the present application.

TECHNICAL FIELD

The present disclosure relates to the technical field of low-frequency vibration isolation, in particular to a negative stiffness generating mechanism and a quasi-zero stiffness vibration isolator.

BACKGROUND ART

The vibration isolator reduces adverse effects of vibration by reducing dynamic coupling between an object to be subjected to vibration isolation and a vibration source, and is widely applied to the fields of aerospace, vehicle transportation, precise instruments and the like. According to the vibration theory, the vibration isolation frequency band of the vibration isolator is determined by the inherent frequency of the vibration isolator, and when the disturbance frequency of the vibration source is larger than $\sqrt{2}$ times of the inherent frequency of the vibration isolator, vibration can be effectively isolated.

There are two important indexes for vibration isolator: vibration isolation bandwidth and bearing capacity. Expanding the vibration isolation bandwidth requires reducing the inherent frequency of the vibration isolator, which is generally achieved by reducing the stiffness of the system or increasing the mass of the system. However, static deformation of the system will be increased by reducing the stiffness of the system and increasing the mass of the system, and in a limited space, the bearing capacity is low, the engineering feasibility is poor, and particularly for low frequency and ultra-low frequency. The bearing capacity is improved in a limited space, the stiffness of the system needs to be increased, the inherent frequency of the vibration isolator is improved, and the vibration isolation frequency band is reduced. Thus, both the vibration isolation bandwidth and the bearing capacity are naturally a pair of paradoxes.

Through a positive and negative stiffness parallel connection mode, the quasi-zero stiffness vibration isolator can achieve high static stiffness and low dynamic stiffness. The bearing capacity of the system is determined by the positive stiffness spring, the negative stiffness element is used for reducing the dynamic stiffness of the system, and the contradiction between the vibration isolation bandwidth and the bearing capacity is effectively solved. A negative stiffness mechanism is an important constituent part of the quasi-zero stiffness vibration isolator. At present, the negative stiffness mechanisms mainly comprise pre-compression horizontal spring type negative stiffness mechanisms, electromagnetic type negative stiffness mechanisms, permanent magnet type negative stiffness mechanisms, buckling beam type negative stiffness mechanisms and the like. Pre-compression horizontal spring type and buckling beam type negative stiffness mechanisms need to be arranged perpendicular to the positive stiffness springs, resulting in a large transverse size. Moreover, force is conducted through mechanical contact, friction can cause actual situations to deviate from theoretical calculation values, and the performance of the vibration isolator is reduced. The permanent magnet type negative stiffness mechanisms and the electromagnetic type negative stiffness mechanisms are generally made into annular shapes and are coaxially arranged with the positive stiffness springs, and the structure is compact. Force conduction is carried out through magnetic field interaction, and the structure belongs to a non-contact negative stiffness structure. Wherein, under the same volume, the magnitude of negative stiffness generated by the permanent magnet type negative stiffness mechanism is far greater than that of the electromagnetic type negative stiffness mechanism.

An existing negative stiffness adjustable quasi-zero stiffness vibration isolation device and an application method thereof (with the application number of 201910816951.9) uses a pre-compression horizontal spring negative stiffness mechanism, the negative stiffness can be adjusted in a static load state, and it is ensured that the mechanism is in an ideal state that the dynamic stiffness is close to zero. However, through the structure, the elastic direction of the elastic element providing negative stiffness is perpendicular to the elastic direction of the elastic element providing positive stiffness, and the elastic force provided by the positive stiffness mechanism and the elastic force provided by the negative stiffness mechanism are perpendicular to each other, resulting in a large transverse space occupation, which cannot be applied to places with high space requirements.

An existing ultra-low frequency air spring vibration isolator based on a magnetic negative stiffness structure (with the application number of 202010606301.4) uses a permanent magnet type negative stiffness mechanism. The magnetic negative stiffness structure is formed by coaxially nesting an inner fixed magnetic ring, an upper movable magnetic ring, a lower movable magnetic ring and an outer fixed magnetic ring. The upper movable magnetic ring and the lower movable magnetic ring are symmetrically arranged relative to the center of the axial height of the inner fixed magnetic ring and are reversely magnetized along the radial direction, and the centers of the axial height of the inner fixed magnetic ring and the outer fixed magnetic ring are on the same horizontal line and are reversely magnetized along the axial direction. However, the vibration isolator is poor in robustness and cannot adapt to interference caused by load and stiffness change.

An existing active electromagnetic negative stiffness micro-vibration isolation device (with the application number of 202011189262.9) is formed by connecting a coaxial nested double-magnet-ring structure and an electrified coil in parallel. The coaxial nested double-magnet-ring structure achieves the negative stiffness characteristic that the stiffness cannot be adjusted in the axial direction, and the energized coil generates precise and controllable excitation magnetic flux to achieve adjustment of the negative stiffness value. Although negative stiffness adjustment can be achieved through the coil in this disclosure, electromagnetic force generated by the electrified coil is small, and the negative stiffness adjustment range is small. Moreover, this disclosure does not relate to balance position adjustment for the load change, and cannot adapt to dry winding caused by load change.

At present, various negative stiffness structures have achieved quasi-zero stiffness characteristics in theory and tests, but quasi-zero stiffness mechanisms are poor in robustness and very sensitive to parameters such as stiffness and load, and failure of the quasi-zero stiffness mechanisms is easily caused. In practical application, the load magnitude and the elastic coefficient of the positive stiffness spring are inevitably deviated. Thus, a negative stiffness generating mechanism with variable load and adjustable stiffness must be provided to ensure that after installation, adjustment is carried out in a static load state according to field conditions, so that the quasi-zero stiffness mechanism is located at an ideal balance position with the dynamic stiffness of close to zero, and the quasi-zero stiffness mechanism is changed into applicability from usability.

SUMMARY

The present disclosure aims to provide a negative stiffness generating mechanism and a quasi-zero stiffness vibration isolator to solve the problems in the prior art, with a compact structure, and capable of being adaptively adjusted according to the difference of positive stiffness and loads, so that the vibration isolator is always located at an ideal balance position with the dynamic stiffness of close to zero.

In order to achieve the purpose, the present disclosure provides the following schemes:

The present disclosure provides a negative stiffness generating mechanism, comprising a base, a housing, a negative stiffness unit and a negative stiffness adjusting device, wherein the housing is installed on the base, and axial relative positions of the housing and the base can be adjusted;

the negative stiffness unit comprises an inner-ring magnet group, an outer-ring magnet group and a supporting shaft, the supporting shaft axially slides on the base and passes through the housing, the inner-ring magnet group comprises a plurality of inner-ring magnets, the plurality of inner-ring magnets all fixedly sleeve the supporting shaft, opposite ends of every two adjacent inner-ring magnets are opposite in polarities, the outer-ring magnet group comprises a plurality of outer-ring magnets, the plurality of outer-ring magnets all sleeve the periphery of the inner-ring magnet group and are divided into an upper group of outer-ring magnets and a lower group of outer-ring magnets to be installed inside the housing, and opposite ends of every two adjacent outer-ring magnets are opposite in polarities;

the upper group of outer-ring magnets and the lower group of outer-ring magnets can synchronously move towards each other or back to back along a direction of the supporting shaft through the negative stiffness adjusting device; and axial relative positions of a middle plane of the outer-ring magnet group and a middle plane of the inner-ring magnet group can be adjusted by adjusting the axial relative positions of the housing and the base.

Preferably, the negative stiffness unit further comprises an upper outer-ring magnet armor and a lower outer-ring magnet armor, and the upper outer-ring magnet armor and the lower outer-ring magnet armor are each connected with one magnet armor end cover, the upper group of outer-ring magnets and the lower group of outer-ring magnets are respectively pressed and fixed to the upper outer-ring magnet armor and the lower outer-ring magnet armor through the magnet armor end covers, the upper outer-ring magnet armor and the lower outer-ring magnet armor are in threaded connection with an inner wall of the housing, thread directions of the upper outer-ring magnet armor and the lower outer-ring magnet armor are opposite, and the upper outer-ring magnet armor and the lower outer-ring magnet armor can synchronously rotate in the housing around the supporting shaft through the negative stiffness adjusting device.

Preferably, the negative stiffness adjusting device comprises an adjusting plate and a plurality of adjusting shafts, the adjusting plate is rotatably connected into the housing around an axis of the supporting shaft and located above the negative stiffness unit, the plurality of adjusting shafts are installed on the adjusting plate and distributed along the circumferential direction of the adjusting plate at intervals, and an axis of each adjusting shaft is parallel to the axis of the supporting shaft; and the upper outer-ring magnet armor and the lower outer-ring magnet armor are both provided with adjusting holes matched with the adjusting shafts, each adjusting shaft passes through a corresponding adjusting hole, and the upper outer-ring magnet armor and the lower outer-ring magnet armor can be driven to synchronously rotate around the axis of the supporting shaft by rotating the adjusting plate.

Preferably, a hexagonal inner groove is formed in middle of the adjusting plate and used for being matched with a hexagonal wrench so as to rotate the adjusting plate through the hexagonal wrench.

Preferably, a first through hole is formed in middle of the adjusting plate, a first shaft sleeve is connected into the first through hole in a matching manner, and an upper end of the supporting shaft is connected into the first shaft sleeve in a slidable manner; and a second through hole is formed in middle of the base, a second shaft sleeve is connected into the second through hole in a matching manner, and a lower end of the supporting shaft is connected into the second shaft sleeve in a slidable manner.

Preferably, the housing is in threaded connection with the base, and the axial relative positions of the housing and the base are adjusted by rotating the housing.

Preferably, a clamping part is arranged on a peripheral surface of the housing, and is used for clamping a wrench so as to rotate the housing through the wrench.

Preferably, the inner-ring magnets and the outer-ring magnets are axially magnetized annular permanent magnets, and the inner-ring magnets and the outer-ring magnets on the same layer are the same in polarity.

The present disclosure also provides a quasi-zero stiffness vibration isolator, comprising a negative stiffness generating mechanism and a positive stiffness unit, wherein the positive stiffness unit is used for providing positive stiffness and can support an external load through the supporting shaft.

Preferably, the positive stiffness unit comprises a first spring, the first spring sleeves a periphery of the supporting shaft, an upper end of the first spring is in contact with a bottom of the inner-ring magnet at a lowermost end, a lower end of the first spring is arranged in an annular groove in an upper surface of the base, and the first spring is in a compressed state in a working stroke.

Compared with the prior art, the present disclosure has the following technical effects.

According to the negative stiffness generating mechanism and the quasi-zero stiffness vibration isolator provided by the present disclosure, each inner-ring magnet fixedly sleeves on the supporting shaft, and each outer-ring magnet sleeves on the periphery of the inner-ring magnet group, the structure that the inner-ring magnets and the outer-ring magnets are arranged around the supporting shaft is used for forming the negative stiffness unit, with a compact structure. Negative stiffness is generated by the inner-ring magnet group and the outer-ring magnet group. After the negative stiffness unit is connected in parallel with the positive stiffness unit, the stiffness of the system near the balance position is very small and is close to zero. According to different positive stiffness elements, the upper and lower groups of outer-ring magnets can synchronously move towards each other or back to back along the direction of the supporting shaft through the negative stiffness adjusting device. The negative stiffness can be adjusted on the premise that the balance position is not changed to adapt to different positive stiffness, so that the vibration isolator is always located at the ideal balance position with the dynamic stiffness of close to zero; and according to different loads, the axial relative positions of the middle plane of the outer-ring magnet group and the middle plane of the inner-ring magnet group can be adjusted by adjusting the axial relative positions of the housing and the base, the two middle plane can coincide, and the negative stiffness unit is always located at the balance position with the axial force of zero. Therefore, the vibration isolator is always located at the ideal balance position with the dynamic stiffness of close to zero. According to the negative stiffness generating mechanism and the quasi-zero stiffness vibration isolator provided by the present disclosure can be adaptively adjusted according to the difference of positive stiffness and loads, so that the vibration isolator is always located at the ideal balance position with the dynamic stiffness of close to zero, and the vibration isolation effect is better.

BRIEF DESCRIPTION OF THE DRAWINGS

To more clearly illustrate the embodiments of the present disclosure or the technical solutions in the prior art, the following briefly introduces the attached figures to be used in the embodiments. Apparently, the attached figures in the following description show merely some embodiments of the present disclosure, and those skilled in the art may still derive other drawings from these attached figures without creative efforts.

Reference signs: 100 negative stiffness generating mechanism; 1 base; 2 housing; 3 negative stiffness unit; 4 negative stiffness adjusting device; 5 positive stiffness unit; 6 supporting shaft; 7 inner-ring magnet; 8 outer-ring magnet; 9 upper outer-ring magnet armor; 10 lower outer-ring magnet armor; 11 magnet armor end cover; 12 adjusting plate; 13 adjusting shaft; 14 adjusting hole; 15 hexagonal inner groove; 16 first shaft sleeve; 17 second shaft sleeve; 18 first spring; and 19 clamping part.

DETAILED DESCRIPTION OF THE EMBODIMENTS

The following clearly and completely describes the technical solutions in the embodiments of the present disclosure with reference to the attached figures in the embodiments of the present disclosure. Apparently, the described embodiments are merely a part rather than all of the embodiments of the present disclosure. Based on the embodiments in the present disclosure, all other embodiments obtained by the person of ordinary skill in the art under the premise of without contributing creative labor belong to the scope protected by the present disclosure.

The present disclosure aims to provide a negative stiffness generating mechanism and a quasi-zero stiffness vibration isolator to solve the problems in the prior art, with a compact structure, and capable of being adaptively adjusted according to the difference of positive stiffness and loads, so that the vibration isolator is always located at an ideal balance position with the dynamic stiffness of close to zero.

To make the foregoing objective, features and advantages of the present disclosure clearer and more comprehensible, the present disclosure is further described in detail below with reference to the attached figures and specific embodiments.

Embodiment I

As shown in FIG. 1 to FIG. 7, this embodiment provides a negative stiffness generating mechanism 100, comprising a base 1, a housing 2, a negative stiffness unit 3 and a negative stiffness adjusting device 4, wherein the housing 2 is installed on the base 1, and the axial relative positions of the housing 2 and the base 1 can be adjusted;

the negative stiffness unit 3 comprises an inner-ring magnet group, an outer-ring magnet group and a supporting shaft 6, the supporting shaft 6 axially slides on the base 1 and passes through the housing 2, the inner-ring magnet group comprises a plurality of inner-ring magnets 7, the inner-ring magnets 7 all fixedly sleeve the supporting shaft 6, the opposite ends of every two adjacent inner-ring magnets 7 are opposite in polarities, the outer-ring magnet group comprises a plurality of outer-ring magnets 7, the outer-ring magnets 8 all sleeve the periphery of the inner-ring magnet group and are divided into an upper group of outer-ring magnets and a lower group of outer-ring magnets to be installed inside the housing 2, and the opposite ends of every two adjacent outer-ring magnets 8 are opposite in polarities;

the upper and lower groups of outer-ring magnets can synchronously move towards each other or back to back along the direction of the supporting shaft 6 through the negative stiffness adjusting device 4; and the axial relative positions of the middle plane of the outer-ring magnet group and the middle plane of the inner-ring magnet group can be adjusted by adjusting the axial relative positions of the housing 2 and the base 1.

Figure 7:
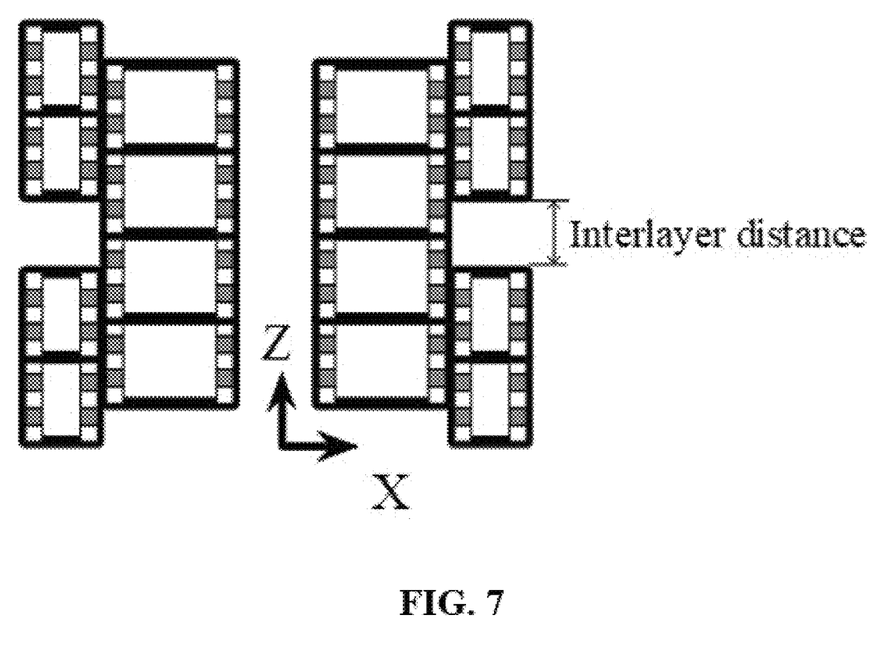
FIG. 7 is a schematic diagram of interlayer distance between an upper group of outer-ring magnets and a lower group of outer-ring magnets in a negative stiffness unit provided by the present disclosure.
Figure 8:
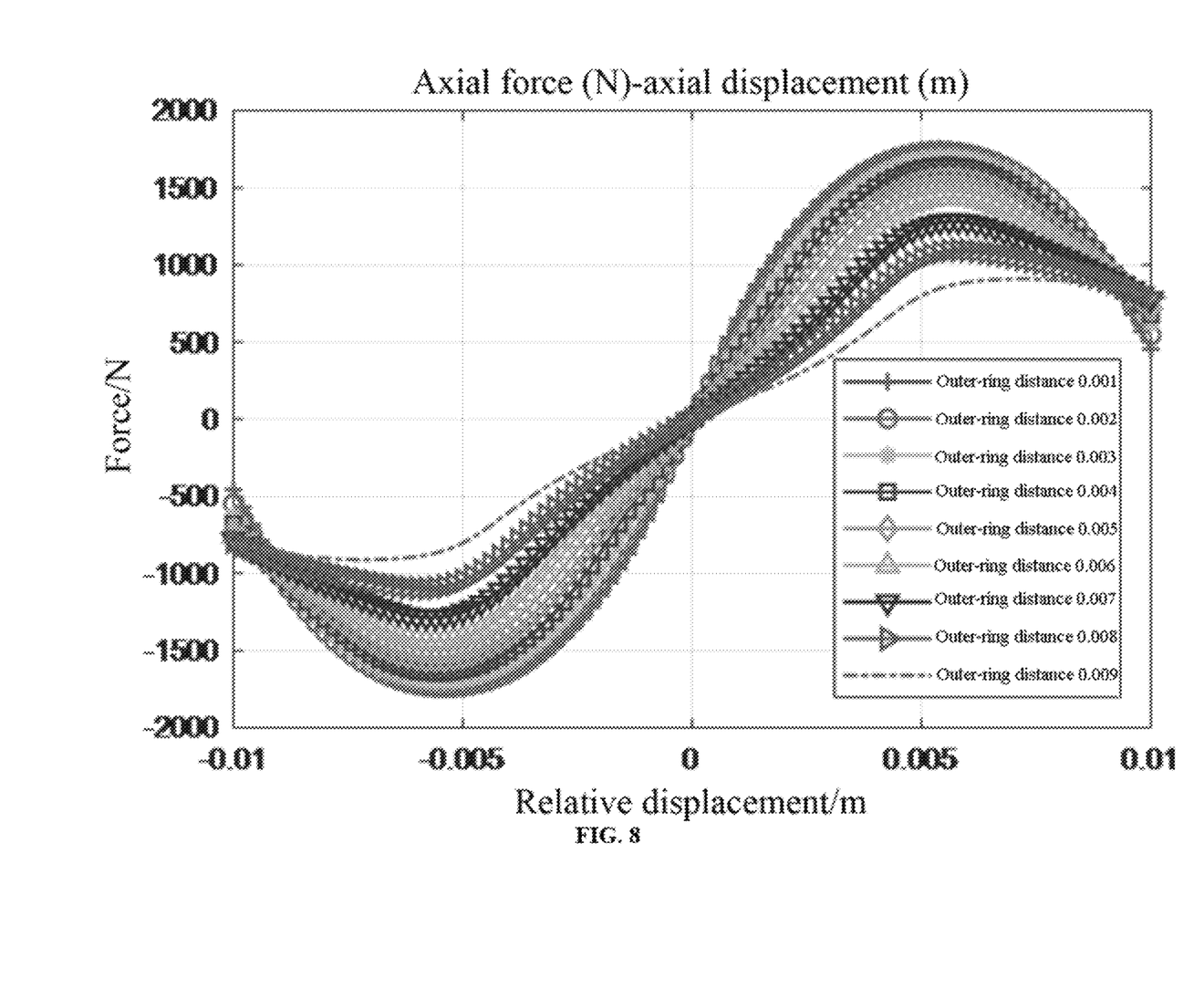
FIG. 8 is a relational diagram of the axial force and the axial displacement of a negative stiffness unit in the negative stiffness unit provided by the present disclosure.
Figure 9:
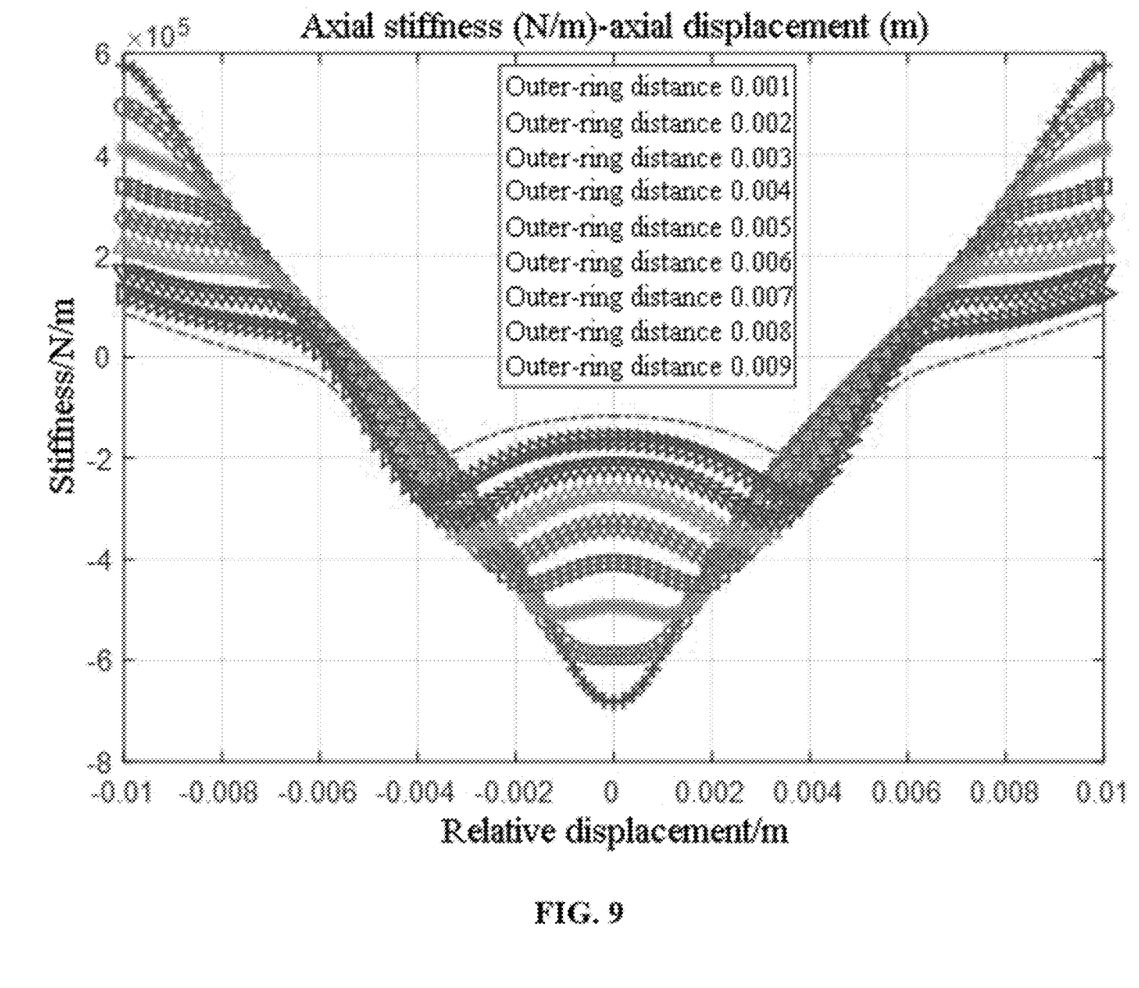
FIG. 9 is a relational diagram of the axial stiffness and the axial displacement of a negative stiffness unit in the negative stiffness unit provided by the present disclosure.
Figure 10:
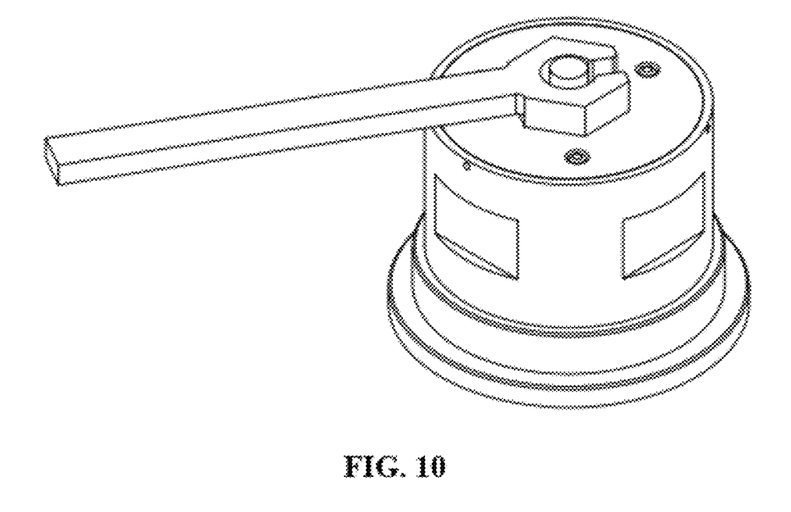
FIG. 10 is a schematic diagram of the state of adjusting an adjusting plate by using a hexagonal wrench.

Each inner-ring magnet 7 is fixedly sleeved on the supporting shaft 6, and each outer-ring magnet 8 is sleeved on the periphery of the inner-ring magnet group, the structure that the inner-ring magnets and the outer-ring magnets are arranged around the supporting shaft 6 is used for forming the negative stiffness unit, with a compact structure; wherein, a plurality of inner-ring magnets 7 are laminated, the middle plane of the inner-ring magnet group is a vertical symmetry central plane, and the middle plane of the outer-ring magnet group is a vertical symmetry central plane of the upper group of outer-ring magnets and the lower group of outer-ring magnets; as shown in FIG. 7, a schematic diagram of interlayer distance between the upper group of outer-ring magnets and the lower group of outer-ring magnets is shown, FIG. 8 is a relational diagram of the axial force and the axial displacement (relative displacement) of a negative stiffness unit, and stiffness calculation of the negative stiffness is obtained by deriving the axial relative displacement through the axial force; as shown in FIG. 9, a relational diagram of the axial stiffness and the axial displacement (relative displacement) of the negative stiffness unit is shown; in FIG. 8 and FIG. 9, the outer-ring distance refers to the interlayer distance between the upper group of outer-ring magnets and the lower group of outer-ring magnets, and the horizontal coordinates represent the axial relative displacements of the middle plane of the outer-ring magnet group and the middle plane of the inner-ring magnet group; when the relative displacement is zero, it means that the middle plane of the outer-ring magnet group coincides with the middle plane of the inner-ring magnet group; the negative stiffness of the negative stiffness unit 3 can be adjusted by adjusting the interlayer distance, after the negative stiffness unit 3 and the positive stiffness unit 5 are connected in parallel, the system stiffness is the sum of each stiffness element according to the equivalent stiffness calculation relation of parallel springs, and therefore the quasi-zero stiffness that the stiffness near the balance position of the system is small and close to zero can be achieved. The balance position refers to the position where the axial force of the negative stiffness unit 3 is zero, namely the position where the middle planes of the inner-ring magnet group and the outer-ring magnet group coincide; according to different positive stiffness elements, the upper and lower groups of outer-ring magnets can synchronously move towards each other or back to back along the direction of the supporting shaft through the negative stiffness adjusting device 4, and the negative stiffness can be adjusted on the premise that the balance position is not changed so as to adapt to different positive stiffness; therefore, the vibration isolator is always located at an ideal balance position with the dynamic stiffness of close to zero; according to different loads, the axial relative positions of the middle plane of the outer-ring magnet group and the middle plane of the inner-ring magnet group can be adjusted by adjusting the axial relative positions of the housing 2 and the base 1, the two middle plane can coincide, and the negative stiffness unit is always located at the balance position with the axial force of zero. Therefore, the vibration isolator is always located at the ideal balance position with the dynamic stiffness of close to zero. According to the negative stiffness generating mechanism 100 provided by the present disclosure can be adaptively adjusted according to the difference of positive stiffness and loads, so that the vibration isolator is always located at the ideal balance position with the dynamic stiffness of close to zero, and the vibration isolation effect is better.

As shown in FIG. 2 to FIG. 5, in the embodiment, the negative stiffness unit 3 further comprises upper outer-ring magnet armor 9 and lower outer-ring magnet armor 10, and the upper outer-ring magnet armor 9 and the lower outer-ring magnet armor 10 are each connected with one magnet armor end cover 11, the upper and lower groups of outer-ring magnets 8 are respectively pressed and fixed on the upper outer-ring magnet armor 9 and the lower outer-ring magnet armor 10 through the magnet armor end covers 11. The upper outer-ring magnet armor 9 and the lower outer-ring magnet armor 10 are in threaded connection with the inner wall of the housing 2, the thread directions of the upper outer-ring magnet armor 9 and the lower outer-ring magnet armor 10 are opposite, and the upper outer-ring magnet armor 9 and the lower outer-ring magnet armor 10 can synchronously rotate in the housing 2 around the supporting shaft 6 through the negative stiffness adjusting device 4; wherein each magnet armor end cover 11 is fixedly connected with the upper outer-ring magnet armor 9 or the lower outer-ring magnet armor 10 through bolts, the structure is simple and easy to install and fix the outer-ring magnets 8. Due to the fact that the upper outer-ring magnet armor 9 and the lower outer-ring magnet armor 10 are opposite in thread rotating direction, when the upper outer-ring magnet armor 9 and the lower outer-ring magnet armor 10 synchronously rotate around the supporting shaft 6 to the housing 2, the upper outer-ring magnet armor 9 and the lower outer-ring magnet armor 10 synchronously move towards each other or back to back, and then the upper group of outer-ring magnets and the lower group of outer-ring magnets are driven to synchronously move towards each other or back to back, so that the negative stiffness can be adjusted on the premise that the balance position is not changed.

Figure 2:
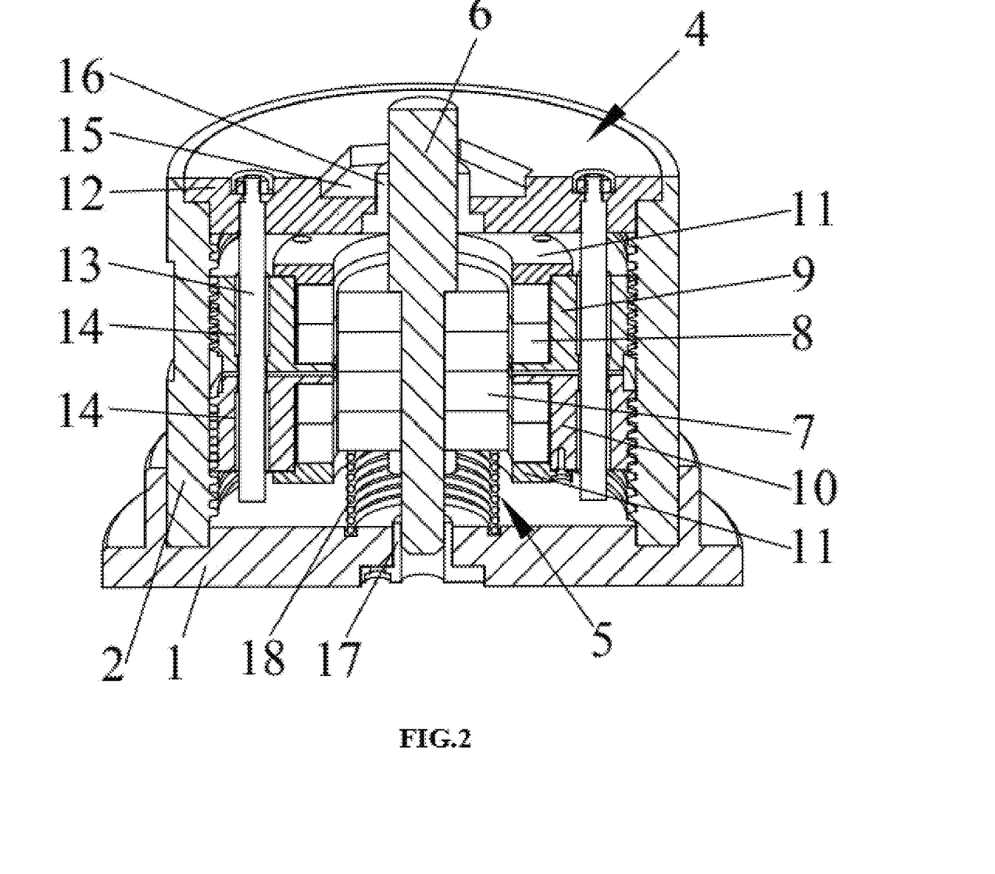
FIG. 2 is a stereoscopic cross-section diagram of a connecting structure of a negative stiffness generating mechanism and a positive stiffness unit provided by the present disclosure.
Figure 3:
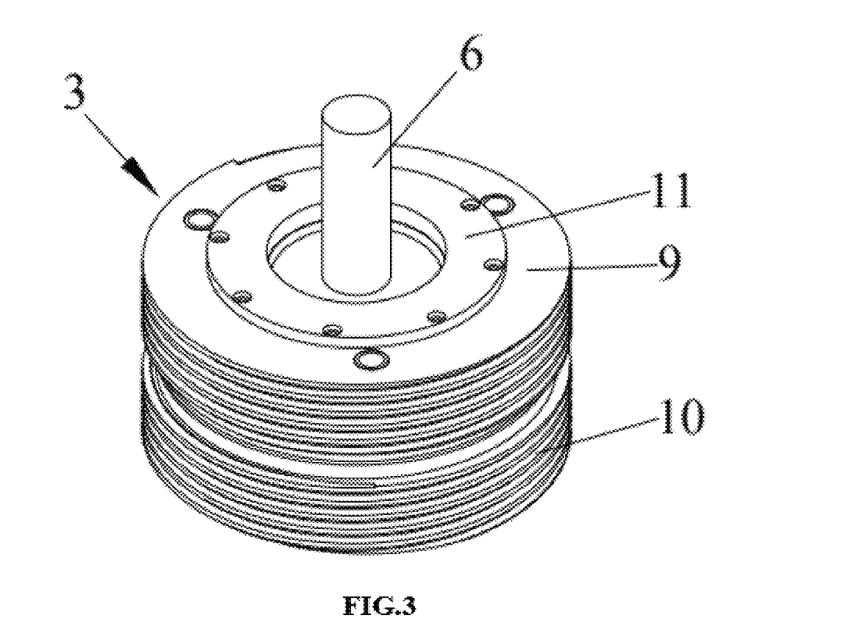
FIG. 3 is a stereoscopic schematic diagram of a negative stiffness unit provided by the present disclosure.
Figure 4:
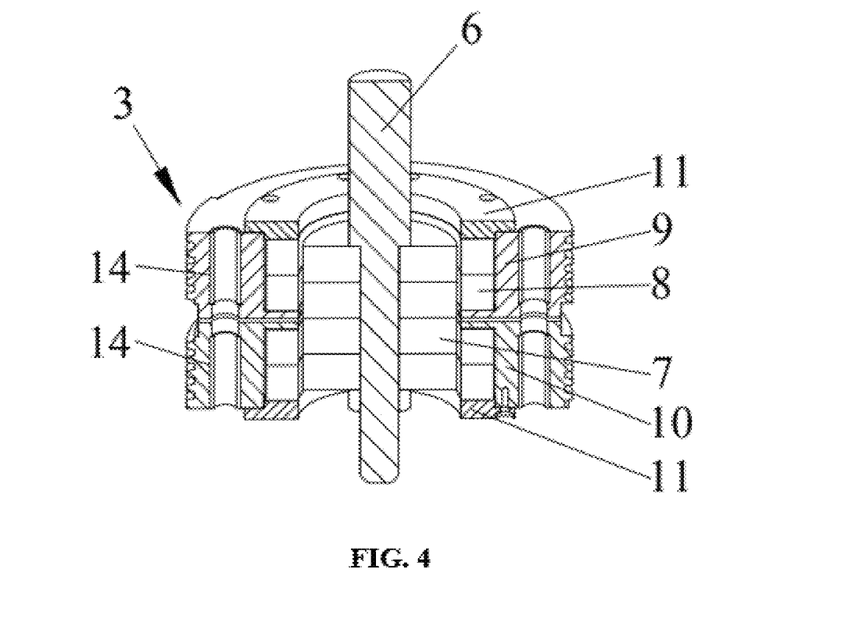
FIG. 4 is a stereoscopic cross-section diagram of a negative stiffness unit provided by the present disclosure.
Figure 5:
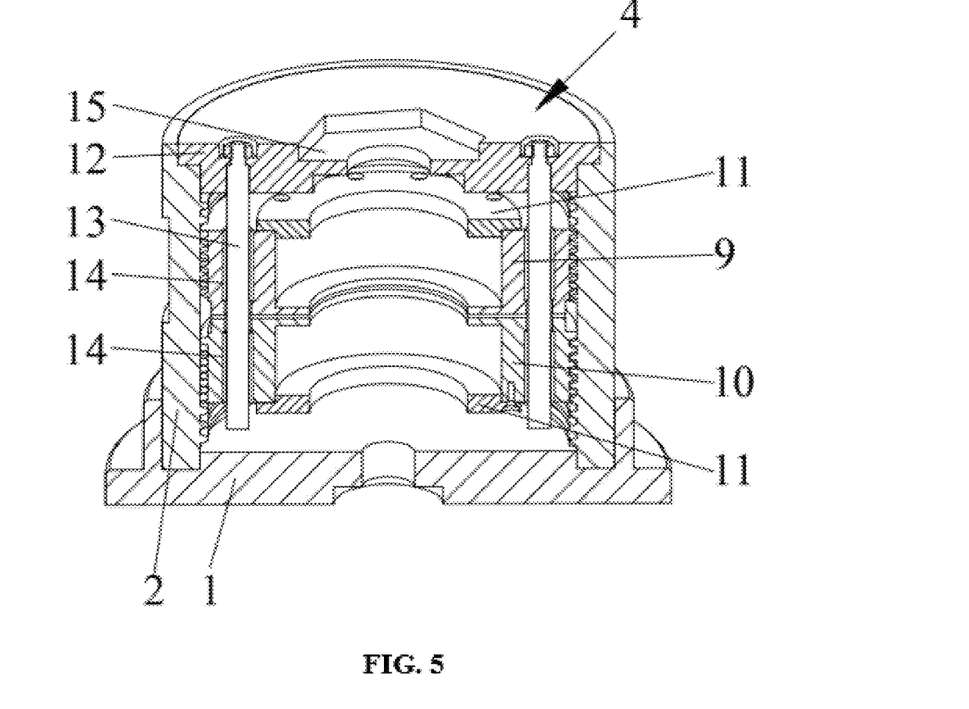
FIG. 5 is a stereoscopic cross-section diagram of a connecting structure of a negative stiffness unit provided by the present disclosure with upper outer-ring magnet armor and lower outer-ring magnet armor.

As shown in FIG. 2 and FIG. 5, in the embodiment, the negative stiffness adjusting device 4 comprises an adjusting plate 12 and a plurality of adjusting shafts 13, the adjusting plate 12 is rotatably connected into the housing 2 around the axis of the supporting shaft 6 and located above the negative stiffness unit 3, the adjusting shafts 13 are installed on the adjusting plate 12 and distributed along the circumferential direction of the adjusting plate 12 at intervals, and the axis of each adjusting shaft 13 is parallel to the axis of the supporting shaft 6; and the upper outer-ring magnet armor 9 and the lower outer-ring magnet armor 10 are both provided with adjusting holes 14 matched with the adjusting shafts 13, and each adjusting shaft 13 passes through the corresponding adjusting hole 14. Wherein, the adjusting plate 12 is in clearance fit with the housing 2 to facilitate rotation of the adjusting plate 12, a shaft sleeve is connected in each adjusting hole 14 in an interference fit mode, each adjusting shaft 13 passes through the corresponding shaft sleeve and can axially move relative to the shaft sleeve, and each adjusting shaft 13 is driven to rotate around the axis of the supporting shaft 6 by rotating the adjusting plate 12. Therefore, the upper outer-ring magnet armor 9 and the lower outer-ring magnet armor 10 are driven to rotate around the axis of the supporting shaft 6, and the upper outer-ring magnet armor 9 and the lower outer-ring magnet armor 10 synchronously move towards each other or back to back. Wherein, a threaded hole is formed in the side wall of the housing 2, after adjustment is in place, a locking bolt is screwed into the threaded hole to enable the locking bolt to abut against the side wall of the adjusting plate, and the adjusting plate 12 is clamped in the housing 2.

As shown in FIG. 1 to FIG. 2, FIG. 5 and FIG. 10, in the embodiment, a hexagonal inner groove 15 is formed in the middle of the adjusting plate 12 and used for being matched with a hexagonal wrench so as to rotate the adjusting plate 12 through the hexagonal wrench. The structure is simple, and easy to adjust rotation of the adjusting plate 12.

As shown in FIG. 2, in the embodiment, a first through hole is formed in the middle of the adjusting plate 12, a first shaft sleeve 16 is connected into the first through hole in a matching manner, and the upper end of the supporting shaft 6 is connected into the first shaft sleeve 16 in a slidable manner; and a second through hole is formed in the middle of the base 1, a second shaft sleeve 17 is connected into the second through hole in a matching manner, and the lower end of the supporting shaft 6 is connected into the second shaft sleeve 17 in a slidable manner. The first shaft sleeve 16 and the second shaft sleeve 17 are connected with the supporting shaft 6 in a matching manner, so that the supporting shaft 6 can only move in the axial direction and cannot generate displacement in the horizontal direction.

In the embodiment, the housing 2 is in threaded connection with the base 1, and the axial relative positions of the housing 2 and the base 1 are adjusted by rotating the housing 2. After different loads are installed at the top end of the supporting shaft 6, the middle plane of the inner-ring magnet group changes. The outer-ring magnet group can be driven to integrally move by rotating the outer housing 2 to adjust the axial relative positions of the outer housing 2 and the base 1, so that the middle plane of the outer-ring magnet group coincides with the middle plane of the inner-ring magnet group. Thus, the negative stiffness unit 3 is always at the balance position with the axial force of zero.

Figure 1:
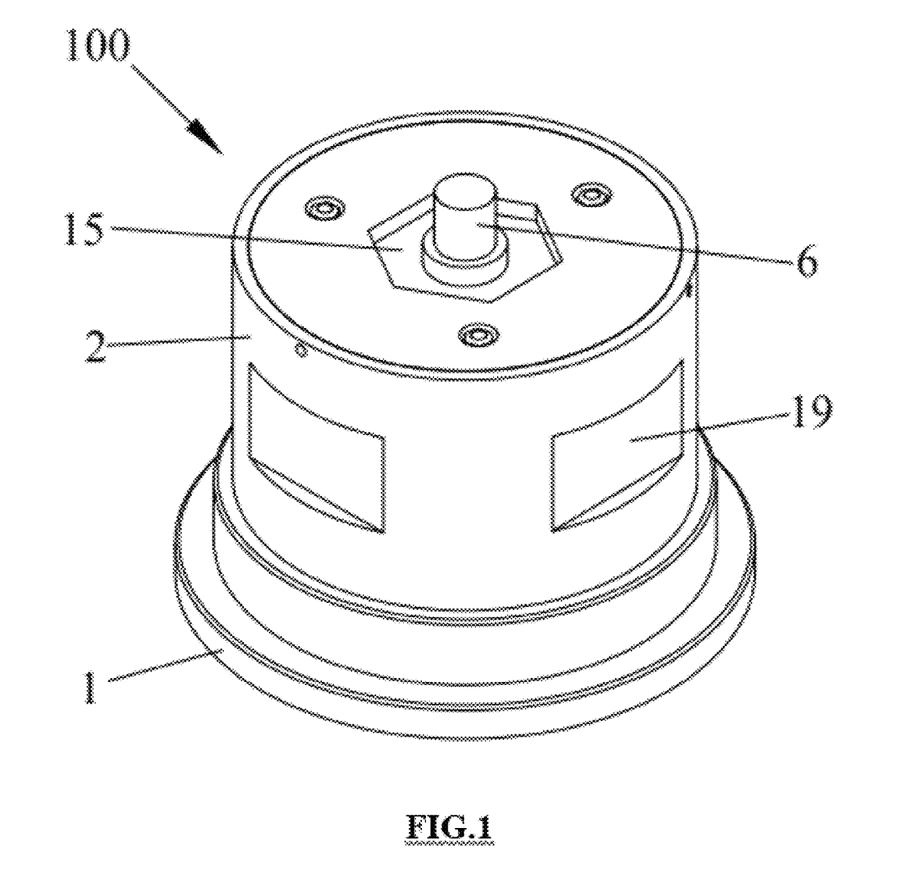
FIG. 1 is a stereoscopic structural schematic diagram of a negative stiffness generating mechanism provided by the present disclosure.
Figure 11:
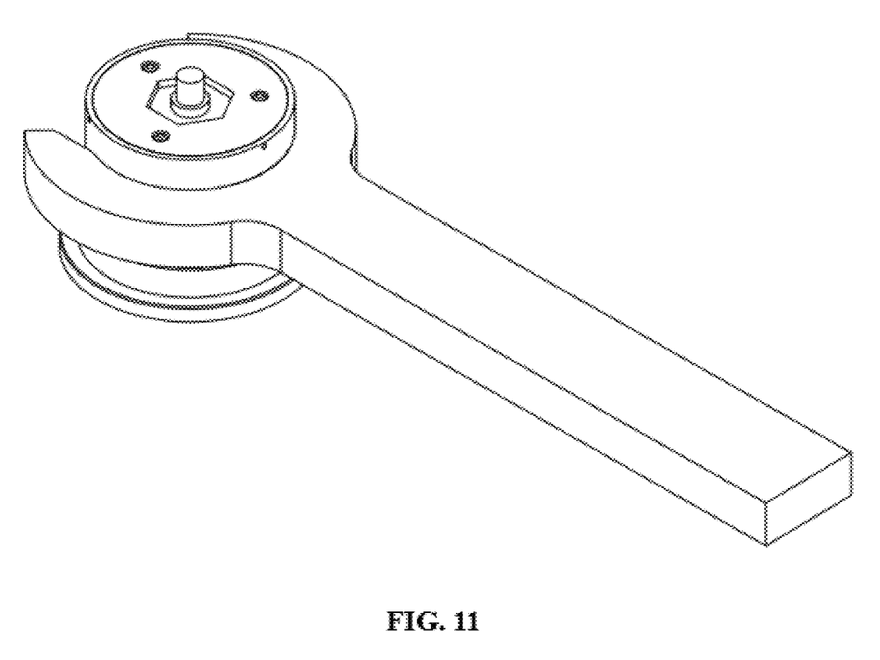
FIG. 11 is a schematic diagram of the state adjusting a housing by using a wrench.

As shown in FIG. 1 and FIG. 11, in the embodiment, a clamping part 19 is arranged on the peripheral surface of the housing 2, and is used for clamping a wrench so as to rotate the housing 2 through a wrench. The structure is simple, and the housing 2 is conveniently and quickly adjusted.

Figure 6:
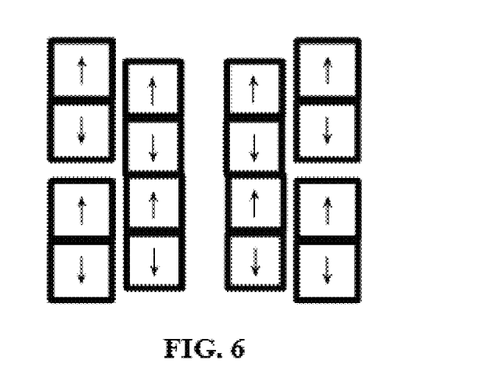
FIG. 6 is a schematic diagram of magnetizing directions and polarities of inner-ring magnets and outer-ring magnets in a negative stiffness unit provided by the present disclosure.

As shown in FIG. 6, the inner-ring magnets 7 and the outer-ring magnets 8 are axially magnetized annular permanent magnets, the inner-ring magnets 7 and the outer-ring magnets 8 on the same layer are the same in polarity. an annular permanent magnet structure is adopted, and compared with an electromagnetic type negative stiffness structure, under the same size, the magnetic field generated by the permanent magnets is much larger than that of a coil, and the magnitude of a permanent magnet type negative stiffness mechanism is larger; and the device can be suitable for positive stiffness elements with larger magnitude, so that the bearing capacity in the same space is stronger.

Embodiment II

The embodiment provides a quasi-zero stiffness vibration isolator, comprising a negative stiffness generating mechanism 100 provided by Embodiment I and a positive stiffness unit 5, wherein the positive stiffness unit 5 is used for providing positive stiffness and can support an external load through the supporting shaft 6.

As shown in FIG. 2, in the embodiment, the positive stiffness unit 5 comprises a first spring 18, the first spring 18 sleeves the periphery of the supporting shaft 6, the upper end of the first spring 18 makes contact with the bottom of the inner-ring magnet 7 at the lowermost end, the lower end of the first spring 18 is arranged in an annular groove in the upper surface of the base 1, and the first spring 18 is in a compressed state in the working stroke. The arrangement of the annular groove prevents the first spring 18 from moving laterally, and during the working stroke of the support shaft 6, the first spring 18 is in the compressed state and provides positive stiffness to the system to support the load.

Specific examples are used for illustration of the principles and implementation methods of the present disclosure. The description of the above-mentioned embodiments is used to help illustrate the method and its core principles of the present disclosure. In addition, those skilled in the art can make various modifications in terms of specific embodiments and scope of application in accordance with the teachings of the present disclosure. In conclusion, the content of this specification shall not be construed as a limitation to the present disclosure.

What is claimed is:

1. A negative stiffness generating mechanism, comprising a base, a housing, a negative stiffness unit and a negative stiffness adjusting device, wherein the housing is installed on the base, and axial relative positions of the housing and the base can be adjusted;

the negative stiffness unit comprises an inner-ring magnet group, an outer-ring magnet group and a supporting shaft, the supporting shaft axially slides on the base and passes through the housing, the inner-ring magnet group comprises a plurality of inner-ring magnets, the plurality of inner-ring magnets all fixedly sleeve the supporting shaft, opposite ends of every two adjacent inner-ring magnets are opposite in polarities, the outer-ring magnet group comprises a plurality of outer-ring magnets, the plurality of outer-ring magnets all sleeve a periphery of the inner-ring magnet group and are divided into an upper group of outer-ring magnets and a lower group of outer-ring magnets to be installed inside the housing, and opposite ends of every two adjacent outer-ring magnets are opposite in polarities;

the upper group of outer-ring magnets and the lower group of outer-ring magnets can synchronously move towards each other or back to back along a direction of the supporting shaft through the negative stiffness adjusting device; and axial relative positions of a middle plane of the outer-ring magnet group and a middle plane of the inner-ring magnet group can be adjusted by adjusting the axial relative positions of the housing and the base.

2. The negative stiffness generating mechanism according to claim 1, wherein the negative stiffness unit further comprises an upper outer-ring magnet armor and a lower outer-ring magnet armor, and the upper outer-ring magnet armor and the lower outer-ring magnet armor are each connected with one magnet armor end cover, the upper group of outer-ring magnets and the lower group of outer-ring magnets are respectively pressed and fixed to the upper outer-ring magnet armor and the lower outer-ring magnet armor through the magnet armor end covers, the upper outer-ring magnet armor and the lower outer-ring magnet armor are in threaded connection with an inner wall of the housing, thread directions of the upper outer-ring magnet armor and the lower outer-ring magnet armor are opposite, and the upper outer-ring magnet armor and the lower outer-ring magnet armor can synchronously rotate in the housing around the supporting shaft through the negative stiffness adjusting device.

3. The negative stiffness generating mechanism according to claim 2, wherein the negative stiffness adjusting device comprises an adjusting plate and a plurality of adjusting shafts, the adjusting plate is rotatably connected into the housing around an axis of the supporting shaft and located above the negative stiffness unit, the plurality of adjusting shafts are installed on the adjusting plate and distributed along a circumferential direction of the adjusting plate at intervals, and an axis of each adjusting shaft is parallel to the axis of the supporting shaft; and the upper outer-ring magnet armor and the lower outer-ring magnet armor are both provided with adjusting holes matched with the adjusting shafts, each adjusting shaft passes through a corresponding adjusting hole, and the upper outer-ring magnet armor and the lower outer-ring magnet armor can be driven to synchronously rotate around the axis of the supporting shaft by rotating the adjusting plate.

4. The negative stiffness generating mechanism according to claim 3, wherein a hexagonal inner groove is formed in middle of the adjusting plate and used for being matched with a hexagonal wrench so as to rotate the adjusting plate through the hexagonal wrench.

5. The negative stiffness generating mechanism according to claim 3, wherein a first through hole is formed in middle of the adjusting plate, a first shaft sleeve is connected into the first through hole in a matching manner, and an upper end of the supporting shaft is connected into the first shaft sleeve in a slidable manner; and a second through hole is formed in middle of the base, a second shaft sleeve is connected into the second through hole in a matching manner, and a lower end of the supporting shaft is connected into the second shaft sleeve in a slidable manner.

6. The negative stiffness generating mechanism according to claim 1, wherein the housing is in threaded connection with the base, and the axial relative positions of the housing and the base are adjusted by rotating the housing.

7. The negative stiffness generating mechanism according to claim 6, wherein a clamping part is arranged on a peripheral surface of the housing, and is used for clamping a wrench so as to rotate the housing through the wrench.

8. The negative stiffness generating mechanism according to claim 1, wherein the inner-ring magnets and the outer-ring magnets are annular permanent magnets magnetized axially, and the inner-ring magnets and the outer-ring magnets on a same layer are the same in polarity.

9. The negative stiffness generating mechanism according to claim 1 further comprising
a positive stiffness unit, wherein the positive stiffness unit is used for providing positive stiffness and can support an external load through the supporting shaft to provide a quasi-zero stiffness vibration isolator.

10. The quasi-zero stiffness vibration isolator according to claim 9, wherein the positive stiffness unit comprises a first spring, the first spring sleeves a periphery of the supporting shaft, an upper end of the first spring is in contact with a bottom of the inner-ring magnet at a lowermost end, a lower end of the first spring is arranged in an annular groove in an upper surface of the base, and the first spring is in a compressed state in a working stroke.

11. The quasi-zero stiffness vibration isolator according to claim 9, wherein the negative stiffness unit further comprises an upper outer-ring magnet armor and a lower outer-ring magnet armor, and the upper outer-ring magnet armor and the lower outer-ring magnet armor are each connected with one magnet armor end cover, the upper group of outer-ring magnets and the lower group of outer-ring magnets are respectively pressed and fixed to the upper outer-ring magnet armor and the lower outer-ring magnet armor through the magnet armor end covers, the upper outer-ring magnet armor and the lower outer-ring magnet armor are in threaded connection with an inner wall of the housing, thread directions of the upper outer-ring magnet armor and the lower outer-ring magnet armor are opposite, and the upper outer-ring magnet armor and the lower outer-ring magnet armor can synchronously rotate in the housing around the supporting shaft through the negative stiffness adjusting device.

12. The quasi-zero stiffness vibration isolator according to claim 10, wherein the negative stiffness adjusting device comprises an adjusting plate and a plurality of adjusting shafts, the adjusting plate is rotatably connected into the housing around an axis of the supporting shaft and located above the negative stiffness unit, the plurality of adjusting shafts are installed on the adjusting plate and distributed along a circumferential direction of the adjusting plate at intervals, and an axis of each adjusting shaft is parallel to the axis of the supporting shaft; and the upper outer-ring magnet armor and the lower outer-ring magnet armor are both provided with adjusting holes matched with the adjusting shafts, each adjusting shaft passes through a corresponding adjusting hole, and the upper outer-ring magnet armor and the lower outer-ring magnet armor can be driven to synchronously rotate around the axis of the supporting shaft by rotating the adjusting plate.

13. The quasi-zero stiffness vibration isolator according to claim 11, wherein a hexagonal inner groove is formed in middle of an adjusting plate and used for being matched with a hexagonal wrench so as to rotate the adjusting plate through the hexagonal wrench.

14. The quasi-zero stiffness vibration isolator according to claim 11, wherein a first through hole is formed in middle of an adjusting plate, a first shaft sleeve is connected into the first through hole in a matching manner, and an upper end of the supporting shaft is connected into the first shaft sleeve in a slidable manner; and a second through hole is formed in middle of the base, a second shaft sleeve is connected into the second through hole in a matching manner, and a lower end of the supporting shaft is connected into the second shaft sleeve in a slidable manner.

15. The quasi-zero stiffness vibration isolator according to claim 9, wherein the housing is in threaded connection with the base, and the axial relative positions of the housing and the base are adjusted by rotating the housing.

16. The quasi-zero stiffness vibration isolator according to claim 14, wherein a clamping part is arranged on a peripheral surface of the housing, and is used for clamping a wrench so as to rotate the housing through the wrench.

17. The quasi-zero stiffness vibration isolator according to claim 9, wherein the inner-ring magnets and the outer-ring magnets are annular permanent magnets magnetized axially, and the inner-ring magnets and the outer-ring magnets on a same layer are the same in polarity.

* * * * *